Figure 1:
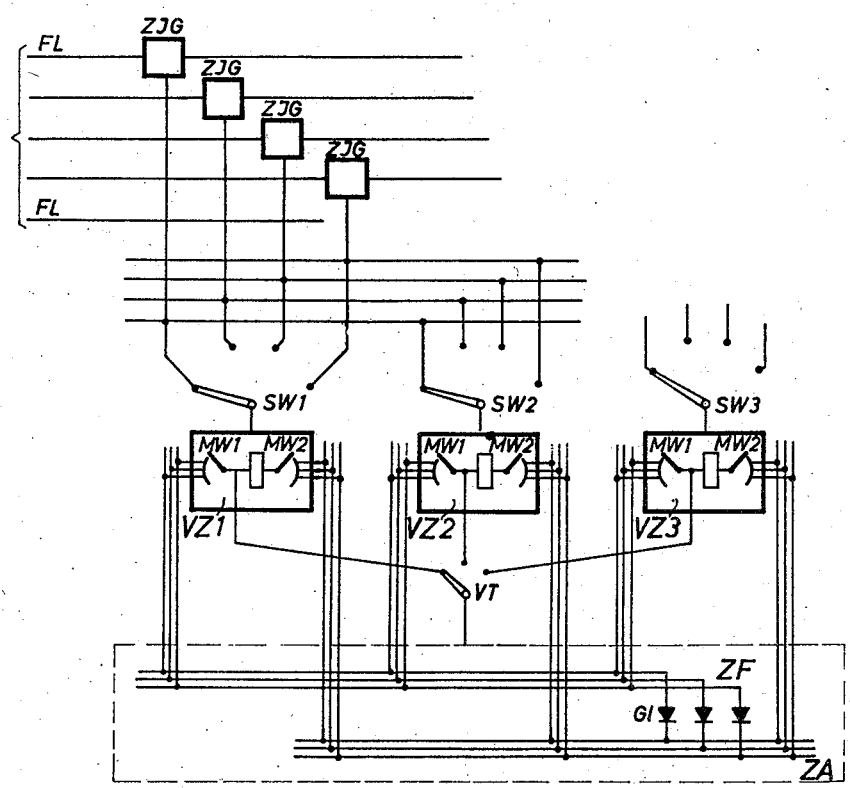

Jan. 7, 1958    H. J. LURK ET AL    2,819,346
TESTING CIRCUIT ARRANGEMENTS FOR SIGNALING SYSTEMS
Filed Oct. 14, 1954    4 Sheets-Sheet 1

Inventors.
Hans Joachim Lurk,
Hartmut Skawski.
By
Atty.

United States Patent Office 2,819,346
Patented Jan. 7, 1958

2,819,346

TESTING CIRCUIT ARRANGEMENTS FOR SIGNALING SYSTEMS

Hans Joachim Lurk and Hartmut Skawski, Munich, Germany, assignors to Siemens & Halske Aktiengesellschaft, Munich and Berlin, Germany, a corporation of Germany Application October 14, 1954, Serial No. 462,333

Claims priority, application Germany October 26, 1953

11 Claims. (Cl. 179—18)

This invention relates to circuit arrangements for signaling systems, particularly automatic telephone systems of the type wherein switching elements such as registers, zone-determining devices, zone-evaluating devices and the like, which may be centrally located, are common to a plurality of connecting paths or connecting devices, and is particularly concerned with testing circuits. It is known to use search or distributor switches for connecting the centrally located switching elements to the connecting path or connecting device seizing the same, such search or distributor switches generally being fixedly associated with the corresponding centrally located switching elements. It is also known to use centrally located chain circuits for effecting the connection of such switching elements.

These centralized arrangements have the disadvantage that any disturbance at the centrally located connecting device, whether it be a mechanical rotary switch or a relay chain, may paralyze the entire operation. In the case of mechanical distributor switches, a further disadvantage resides in the fact that the switches may have to perform many idling steps before reaching the line calling for the connection of a centrally located switching element; this entails an undesirable loss of time.

The present invention overcomes this disadvantage by providing for the individual lines or connecting devices a common test multiple adapted to be tested by quick-acting test relays respectively associated with the individual lines or connecting devices, preferably with the use of a first testing conductor cooperating with two resistors and forming therewith a voltage divider, and a second testing conductor including the corresponding test relay. Since double seizures are rendered impossible in this kind of testing procedure due to immediate blocking, that is, since the simultaneous arrival of several incoming signals would normally have the result that none of them actuates the centrally located switching element, a further feature of the present invention provides for separating these simultaneously arriving signals by means of a time-spacing switching device. This is accomplished by associating with the individual lines or connecting devices switching elements which, in the event of unsuccessful testing of the common test multiple by a testing relay, cause the testing to be cyclically repeated in a sequence that promotes the time-spacing of the testing operation. According to a further feature of the present invention, this in turn is accomplished by making one of the switching intervals of a relay interrupter which periodically closes the testing circuit, relatively long, preferably by making the corresponding switching interval long as compared with the intervals during which the testing circuit is closed.

The arrangement according to the present invention results in savings so far as the centrally located distributor switches are concerned and also results in the following additional advantage: Since the switching period of the test relays is inherently quite short, it is most likely that with simultaneous testing of two or more devices at the common switching element, the second attempt will be spaced in time and the testing will be successful, provided of course that the centrally located element has become idle in the meantime. Thus, even in this very rare case of simultaneous testing by two or more devices, it will not be necessary to release the connecting path already built up. This practically eliminates the traffic losses that might otherwise be expected with a small number of centrally located switching elements provided for relatively slight simultaneous traffic.

The invention may be employed particularly advantageously in circuits comprising but a single centrally located switching element, for example, a so-called zone-evaluating device, which in turn is allocated to a plurality of centrally located elements. The zone-determining devices which will be referred to hereinafter for brevity as "zoners." The zoners in turn are common to a major group of toll lines equipped with means for transmitting zone-counting impulses, the so-called metering pulse transmitters.

Figure 2:
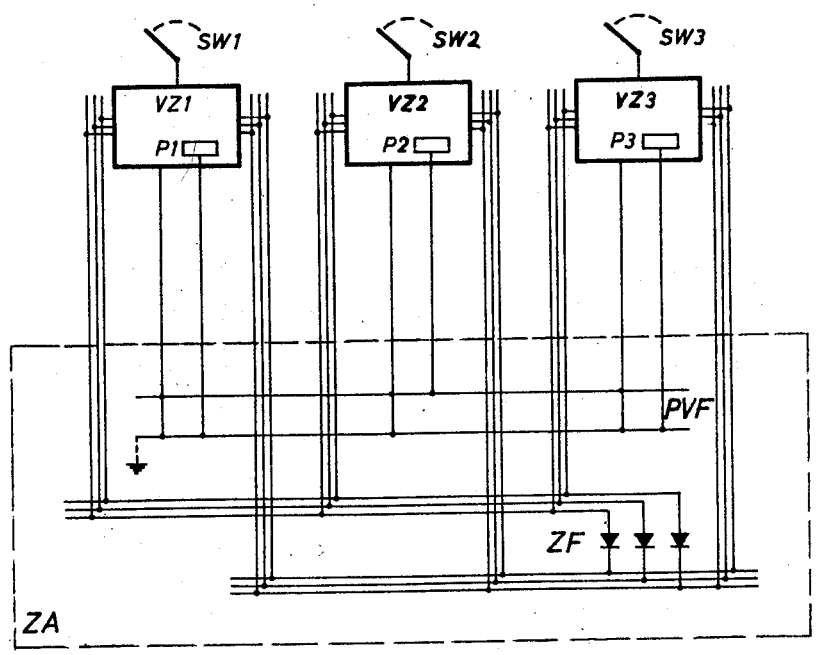
Figure 3A:
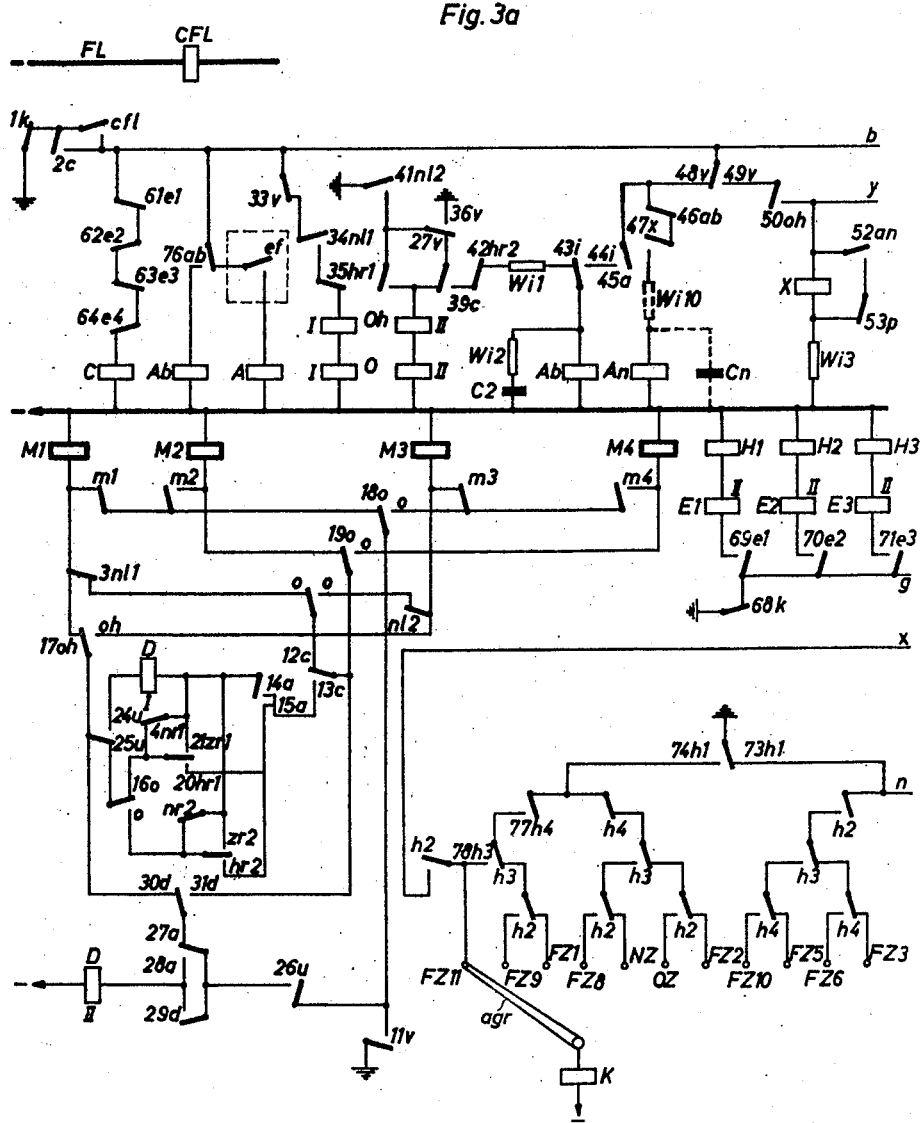
Figure 3B:
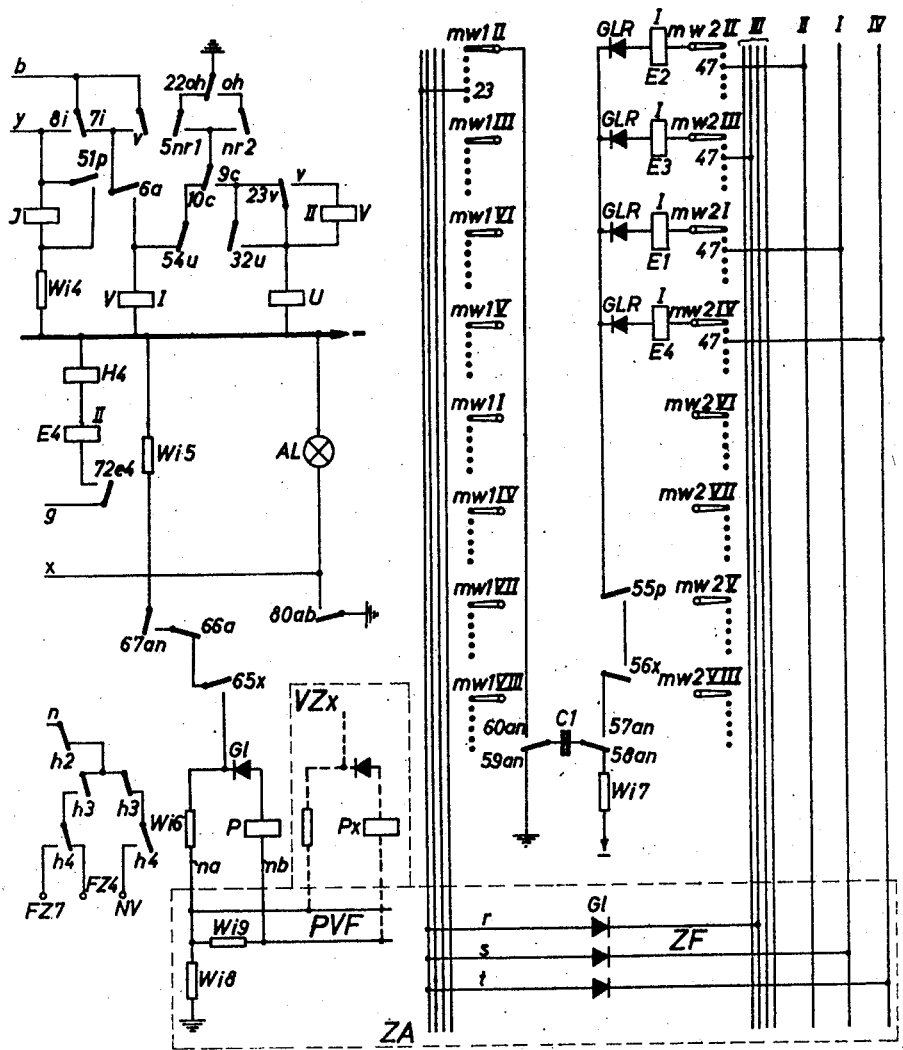

The invention will now be explained in greater detail with reference to the accompanying drawings, in which:

Fig. 1 is a schematic representation of a circuit arrangement of the known type above referred to;

Fig. 2 schematically shows the modification embodied according to the present invention in a portion of the circuit illustrated in Fig. 1; and Figs. 3a and 3b, taken together with identically marked conductors in alignment show a circuit diagram illustrating in greater detail the circuit arrangement according to one embodiment of the invention but omitting those details which are not required for an understanding of the invention.

Referring now to Fig. 1, a large number of toll lines FL, each fixedly associated with a metering pulse transmitter or generator ZJG, has associated therewith a smaller number of zoners VZ1, VZ2, VZ3. The latter are adapted to be connected through the search switches SW1, SW2, SW3 with the seizing metering pulse generators and thus to the corresponding toll lines. Each zoner VZ1 to VZ3 contains associated switches MW1—MW2 for receiving the identifying numbers and for evaluating the latter in the corresponding zone-counting sequence, these switches MW1 and MW2 being generally switches having several adjusting motions, such as lifting-rotary switches, or large-group rotary switches, for example motor-driven switches. For evaluating an identifying number of four digits, each zoner is equipped with two motor-driven switches MW1 and MW2, as shown in Fig. 1. The switch MW1 receives the first two series of impulses while switch MW2 receives the third and fourth impulse series. The outlets of the switches MW1 of all zoners, and the outlets of the switches MW2 of all zoners, are respectively combined in common multiples and, as schematically indicated in Fig. 1, these multiples are connected together over rectifiers G1 and a corresponding line-up of the connections to form a common zoning multiple ZF in a zone-evaluating device ZA that is common to all zoners. In such a common zoning multiple, it is necessary to prevent two or more zoners from simultaneously testing the multiple, as this might result in false zoning. For this reason, a central distributor switch VT has been employed in the past, which successively attends to the calls arriving at the zoning multiple from the individual zoners. It is clear, of course, that the distributor switch VT need not necessarily be constructed as a mechanical rotary switch as shown in Fig. 1 but may be formed of a relay switch or an electronic chain.

As already mentioned, any disturbance at the centrally located distributor switch causes failure of the zone-evaluating device and hence failure to count high-grade connections. For this reason, and in accordance with the present invention, the centrally located distributor switch is omitted and, as shown schematically in Fig. 2, there is provided, in addition to the centrally located zoning multiple ZF, a centrally located test multiple PVF adapted to be separately tested by each individual zoner for a brief time interval. For this purpose, use is made of evaluating and testing elements which inherently have a rapid switching action, particularly quick-acting relays, so as to render unlikely the simultaneous connection of a plurality of zoners with the zoning multiple ZF. Assuming an energization time of 1 millisecond for testing relays P1 to P3 in zoners VZ1 to VZ3, the danger period of possible simultaneous testing likewise is about 1 ms. This danger period is of course much shorter when electronic testing elements are employed.

In order to avoid loss of connections due to unsuccessful seizures, even in the rare case that in this arrangement several zoners should simultaneously make connection with the test multiple PVF, which would require release of the two simultaneously testing connections, and in accordance with a further feature of the present invention, any unsuccessful testing connection of a zoner with the common test multiple PVF, for example, due to an existing seizure of the test multiple by a different zoner, causes a relay interrupter associated with each individual zoner to repeat the testing operation in a sequence that promotes the time-spacing of the testing operation on the mere basis of the tolerance in relay response times. This, in combination with the short switching times of the testing and evaluating relays, will generally suffice to render the second attempt successful when two zoners test simultaneously.

Figs. 3a and 3b show the circuit arrangement according to one embodiment of the present invention in detail, although those details which are not required for an understanding of the invention have been omitted.

In response to seizure of a toll line FL, the seizure relay CFL associated with this line transmits a brief seizure pulse to the zoner VZ which energizes the seizure relay C of the latter over a circuit extending from ground, 1k, cf1, 61e1, 62e2, 63e3, 64e4, C, to battery.

Relay C establishes a holding circuit for itself over its contact 2c, independently of contact cf1 of the seizure relay CFL. The zoner VZ is equipped for receiving a four-digit identifying number and comprises two motor-driven switches MW1 and MW2 (see Fig. 1) which are stepped to the desired contact by large steps leading to a tens group of contacts (decade), and by smaller steps within the corresponding decades (unit selection). The motor-driven selector switches comprise, in a manner known, two field magnets M1, M2 and M3, M4 respectively, which are offset by 90° from each other and which are alternately energized by means of cam contacts $m1$, $m2$ and $m3$, $m4$ respectively, controlled by the motor shafts. This causes rotation of an armature arranged between the corresponding field magnets and drivingly connected, through gearing, with the selector shaft carrying the wipers. The motor-driven switches include so-called zero contacts $n11$, $nr1$ and $n12$, $nr2$ respectively which are closed only in normal switch position but are open in the other switch positions. Furthermore, the selectors include intermediate stop contacts $zr1$, $zr2$ arranged between the decades and serving to intercept the switch upon the occurrence of an excessively long current impulse. The selectors also include main stop contacts $hr1$, $hr2$ arranged at the beginning of the respective decades; these contacts may coincide with the end of the preceding decade. They serve to arrest the selector each time the latter has completed a major rotary step.

Zone evaluation by identification numbers takes place through the selector wiper $mw1II$ (Fig. 3b) of motor-driven switch MW1, the four arms $mw2I$ to $mw2IV$ of motor-driven switch MW2, and the zoning multiple ZF whose lines must, of course, be appropriately lined up.

Connection of the selector multiple to the zoning multiple can be completed only when the test relay P (Fig. 3b) of zoner VZ has tested the centrally located multiple tester PVF (see also Fig. 2). Depending on the line-up of the connections of the zoning multiple, interconnection of the multiples causes energization of a predetermined combination of evaluating relays E1 to E4. These relays identify the corresponding zone through auxiliary relays H1 to H4 at zoning points FZ1 to FZ11, NZ, OZ and NV. Immediately upon actuation of the evaluating relays E, the testing multiple PVF is released. The test relay P and the evaluating relays E should be quick-acting relays with a response or operating time of about 1 ms.

The zoning points of the zoner are scanned by the scanning arm $agr$ of a scanner (not shown) which is started in response to actuation of the auxiliary relays H. The setting of the scanner is transmitted—in a manner not shown herein—to a selector switch of the metering pulse generator associated with the seized toll line; this causes a corresponding zone-metering pulse sequence to be connected to the seized toll line so that the meter of the calling subscriber periodically receives metering pulses during the conversation.

After this general explanation, the operation of the circuit arrangement according to Fig. 3 may now be discussed in detail.

Upon seizure of zoner VZ by toll line FL, the pulse series arriving over this toll line are received by a receiving relay EF (not shown) of this line and transmitted to the impulse transmitting relay A of the zoner in a circuit extending from ground, 1k, 2c, 76ab, ef, A, to battery.

Relay A is actuated in step with the pulses. The first pulse of the series energizes relay V (Fig. 3b) over its winding I from ground, 1k, 2c, conductor b, 7i, 6a, V(I), to battery.

Relay V is made slow-to-release by shunting its winding II at its contact 23v and remains operated during the series of pulses in conventional manner. As long as relay A is energized during the first impulse, the field magnets M1 and M2 of motor-driven selector switch MW1 are both energized respectively through the circuits extending from ground, 11v, 18o, m1 (cam contact), M1, to battery; and ground, 11v, 18o, m1, 17oh, 16o, 4nr1 (normal contact), 14a, 13c, 19o, M2, to battery.

As long as both field magnets are energized, the switch cannot start. When relay A is restored after the first impulse, field maget M1 alone will be energized as the circuit for field magnet M2 is broken at contact 14a. The selector switch then starts and automatically rotates its wipers to the first stop which identifies the beginning of the first decade and constitutes a main stop position. In this position the main stop contact 20hr1 is closed, and this supplies current simultaneously to both field magnets M1, M2, regardless of whether it is cam contact $m1$ or $m2$ that is closed at that time. In the illustrated position, field magnet M1 is energized in a circuit extending from ground, 11v, 18o, m1, to battery, while magnet M2 is energized in a circuit extending from ground, 11v, 18o, m1, 17oh, 16o, 20hr1, 15a, 13c, 19o, M2, to battery.

Upon the next impulse of the first series, relay A again responds and opens the circuit for field magnet M2 at contact 15a. The selector switch is again started and sweeps through the first decade under the control of the alternately closed cam contacts $m1$, $m2$. If the impulse should still continue, that is, if relay A should continue to be energized, the selector will be stopped in the intermediate stop position over a circuit including the contacts 21zr1 and 14a as both field magnets are energized again. When relay A thereafter releases, the selector sweeps to the end position of the decade, where it is stopped by closure of the corresponding main stop contact. In this manner the selector moves its wipers relative to the decade identified by the series of impulses, and finally stops after release of relays A and V. After release of relay V, relay U (Fig. 3a), serving to switch over to unit selection, is energized from ground, 22oh, 5nr1 (normal contact), 9c, 23v, U, to battery.

Relay U continues to hold over its own contact 32u independent of relay V.

Upon receipt of the next series of impulses, relay A is again energized in step with such impulses. Relay V remains actuated during this pulse series. As long as relay A is energized during the first impulse of this series, both field magnets M1, M2 are again energized respectively from ground, 11v, 18o, m1, M1 to battery, and from ground, 11v, 18o, m1, 17oh, 24u, D(I), 14a, 13c, 19o, M2, to battery.

The last-mentioned circuit extends over the winding I of relay D in series with field magnet M2. However, relay D does not respond as the opposing winding D(II) (Fig. 3a, bottom left) is simultaneously energized upon actuation of relay A from ground, 11v, 26u, 28a, D(II), to battery.

Upon release of relay A, the circuit for field magnet M2 is broken. Field magnet M1 alone is now energized and the selector will accordingly start but will execute only a quarter-turn or one step. This causes opening of cam contact m1 and closing of cam contact m2. After this step, both field magnets will again be energized, the respective circuits being for M2 from ground, 11v, 18o, m2, M2, to battery; and for M1 from ground, 11v, 26u, 27a, 30d, 17oh, M1, to battery.

The selector thereupon stops. At the next pulse of the series, the impulse relay A will again respond. It opens the circuit for field magnet M1 at contact 27a and closes the circuit for winding II of relay D at contact 28a. However, field magnet M1 remains energized in a circuit extending from ground, 11v, 18o, m2, 19o, 13c, 14a, D(I), 24u, 17oh, M1, to battery.

Relay D is now connected in series with field magnet M1. The current flows now in both windings of relay D in the same direction and the relay accordingly energizes. When the current impulse is terminated, relay A releases and opens the circuit for field magnet M1. Field magnet M2 will then alone be energized, starting the selector, which travels through one step. This causes opening of cam contact m2 and closing of m1. The following circuit is now closed for field magnet M1 namely from ground, 11v, 18o, m1, M1, to battery.

Simultaneously, field magnet M2 is energized in a circuit extending from ground, 11v, 26u, 27a, 31d, 19o, M2, to battery.

Upon arrival of the next pulse, the circuit for field magnet M2 is opened at contact 27a, the selector travels through another step, cam contact m1 being opened and contact m2 being closed. This cycle of operations is repeated for each impulse. The motor driven selector switch MW1 is in this manner actuated incident to the second pulse series. Assuming that the first two series of impulses correspond to the first two digits 2, 3 of identifying number 2347, the selector wiper mw1II will then come to a stop at contact 23.

After the second series of pulses and release of relay V, switchover relays Oh and O will be energized in a circuit extending from ground, 1k, 2c, 33v, 34n11 (normal contact), 35hr1 (main stop contact), Oh(I), O(I), to battery.

Relay O switches the pulse transmitting circuit over to field magnets M3 and M4 at contact 18o. Motor-driven selector MW2 will be set by the third and fourth series of pulses in accordance with the digits 4 and 7. The circuits for field magnets M3 and M4 are similar to those for field magnets M1 and M2 of selector switch MW1; they can easily be traced in the drawing.

At the beginning of the third pulse series, relays J and X are energized in parallel in the following circuit from ground, 1k, 2c, 49v, 50oh, (X, Wi3) (J, Wi4) to battery.

Holding circuits for these relays, independent of relay V, are closed at contact 8i. Relays X and J also are quick operating relays which are actuated within about 1 ms.

After termination of the third series of pulses, relay V is released. Relay An is then actuated over a circuit extending from ground, 1k, 2c, 48v, 46ab, 47x, An, to battery.

Energization of relay An closes at contact 67an a test circuit leading to the test multiple. The test circuit (Fig. 3a) comprises two parallel branches constituting a voltage divider circuit extending from ground, Wi8, conductor na, Wi6, 65x, 66a, 67an, Wi5, to battery.

In parallel with the resistor Wi6, test relay P tests over conductor nb the partial voltage between the individual resistor Wi6 and the common resistor Wi8 and resistor Wi9. The test relay P again is one that responds within 1 ms. The test circuit has the result that in the event of several zoners simultaneously making test connections to the test multiple, the partial voltage at the voltage divider drops due to the parallel connection of the associated individual resistors Wi6. Moreover, the current is divided between the corresponding test relays. The latter receive inadequate current so that none of the simultaneously connecting test relays is actuated. If, however, one of the test relays has a potential indicating idle condition, it will be held even though a second test relay should be testing in parallel, whereas this second relay cannot be actuated.

Let us assume first that test relay P of the seized zoner has found the test multiple to be idle and has been actuated. Upon actuation of this relay P, current from the previously charged capacitor C1 (circuit extending from ground (Fig. 3b, right bottom), 59an, C1, 58an, resistor Wi7, to battery) is applied to the selector wipers of switches MW1 and MW2 through contacts 55p, 56x, 57an, C1 and 60an so as to establish a test connection and to determine whether the desired zone has been reached after the third ordinal digit of the identifying number.

Let us assume that this is not the case. Consequently, no circuit is established for the zone multiple ZF. Upon actuation of relay P, relay J is short-circuited over contact 51p. Relay J releases rapidly. Upon release of relay J and consequent opening of contact 8i, relay X will also rapidly release. The sum-total of the releasing times of the two relays is about 2.5 ms. Release of relay X opens the test circuit for the test multiple PVF at contact 65x, thus releasing the test multiple. Release of relay X also releases relay An by opening contact 47x. After release of relay X, test relay P is likewise released.

At the beginning of the fourth impulse series, relays X and J are again energized in parallel. Their holding circuits, independent of relay V, are again established at contact 8i. At the end of the fourth impulse series, release of relay V again energizes relay An. The test relay P can now again make the test in the test multiple PVF. Assuming the test multiple is idle, relay P will be actuated. It has been assumed that after the fourth digit of the identifying number, the desired zone is identified through the cross wiring of the common zoning multiple. Relay P, over its contact 55p and contacts 56x, 57an and 60an of relays X and An (which are still energized) connects the charged capacitor C between the selector wipers mw1II and mw2I to mw2IV for testing. This results in actuation of the evaluating relays E3, E1 and E4 over the selector multiple and the common zoning multiple, in the following circuit 1: C1, 60an, mw1II (on contact 23), conductor r, G1 (ZF), mw2III (on contact 47), E3, GLR, 55p, 56x, 57an, C1.

In parallel with relay E3, a circuit over the multiple of switch MW1, line s of zoning multiple ZF, the multiple of switch wiper mw2I operates relay E1, and a circuit over line t of the zoning multiple and the multiple of switch arm mw2IV operates relay E4. The following holding circuits are closed for relays E1, E3 and E4 over the respective second windings thereof, shown in Figs. 3a and 3b: For E1: ground, 68k, 69e1, E1(II), H1, battery; for E3: ground, 68k, 71e3, E3(II), H3, battery; for E4: ground, 68k, conductor g, 72e4, E4(II), H4, battery.

The auxiliary relays H1, H3 and H4 included in these circuits also operate. Through a contact pyramid: Ground, 74h1, 77h4, 78h3, these auxiliary relays identify zone point FZ11 (Fig. 3a). Scanning wiper agr immediately thereafter engages this zone point. When it reaches this point, relay K which is connected with the scanning wiper, is energized and opens the holding circuits for relays E and H at contact 68k. Operation of the evaluating relays E1, E3, and E4 opens, the holding circuit for busy relay C at contact 61e1, 63e3 and 64e4; relay C accordingly restores and releases the zoner VZ.

If none of the evaluating relays E is operated after the fourth impulse series, for example due to nonoperation of testing relay P because of a disturbance in the testing circuit, or due to an unzoned identifying number, relay Ab (Fig. 3a) will be operated with delay in a circuit extending from: ground, 41n12, 27v, 39c, 42hr2, resistor Wi1, 43i $$\frac{Ab}{Wi2, C2}$$

to battery.

As soon as one of the evaluating relays E operates and relay C releases, this last-mentioned circuit is interrupted at contact 39c before relay Ab operates. Relay Ab, over its contact 80ab, switches closes a circuit for a warning signal lamp AL (Fig. 3b) provided in the zoner and/or causes release of the connection.

Let us now consider the case that the zoner, having received the four impulse series of the identifying number, cannot make the testing connection to the test multiple. This may occur because another zoner has already seized the test multiple, or because two zoners simultaneously make testing connections to the test multiple.

Upon restoration of relay V after the fourth impulse series, relay An is operated and establishes the test circuit (Fig. 3b) over contacts 67an, 66a, 65x, since relay X has already been operated including its contact 8i. Since relay P cannot operate, for example because a testing relay Px of some other zoner VZx is simultaneously making a test connection to the test multiple, the following switching operations will take place during the period of response of release relay Ab:

Relay J, not being short-circuited through contact 51p, is not released and remains energized over its holding circuit. Relay X, however, is short-circuited over contact 52an since contact 53p did not open. Relay X is restored within two milliseconds. Release of relay X opens the test circuit at contact 65x. Relay X restores relay An at contact 47x. However, the short-circuit for relay X is interrupted again at contact 52an and relay X again operates. Through its contact 47x, it again actuates relay An. Upon actuation of the two relays X and An, the testing circuit for test relay P to the test multiple is reestablished. This make-and-break interrupter cycle of relays X and An is repeated until relay P finds the test multiple idle and operates. The operation of the relay interruptor formed by relays X and An is such that the period of closure of the testing circuit at contact 65x is very brief, due to the rapid release action of relay X, while the period of opening of the test circuit is long, due to the delay in response of the relay An. The opening interval of the testing circuit is defined by the sum of the restoring time of relay An, the actuation time of relay X and the actuation time of relay An.

As the relay interruptor formed by similar X and An relays in the simultaneously-testing, identically-connected second zoner VZ operates in the same manner, and as the actuation time for each test relay is only one millisecond, a time difference of 1 ms. is sufficient to permit one of the two test relays to ascertain an idle condition through the test multiple. The inherent spacing in the operation of the interrupter relays An and X, and particularly the actuation interval of relay An, suffices to bring about this time spacing of 1 ms. afetr the second attempt at the latest.

Incidentally, and as indicated in broken lines in Fig. 3a, the actuation time of relay An and hence the testing interval may also be positively determined by means of a shunt-connected capacitor Cn in combination with a resistor Wi10 ahead of the relay An.

If, after the idle condition has been tested, the second zoner repeates the testing attempt, then relay Ab is operated at the latest at the beginning of the next-following impulse series in a circuit extending from ground, 1k, 2c, 48v, 45a, 44i, Ab, to battery.

Relay Ab releases the connection.

It is understood that the invention may be used in signaling systems outside of its specific use in telephone systems, and the latter designation, as used in the claims, is accordingly intended to embrace other uses thereof.

What is believed to be new and desired to have protected by Letters Patent is defined in the appended claims.

We claim:

1. In a telephone system, a centrally disposed switching device, a plurality of connecting devices adapted to extend connections over said centrally disposed switching device, a circuit arrangement for controlling the connection of any one of said connecting devices with said switching device, said circuit arrangement comprising a test multiple common to a plurality of said connecting devices, quick-operating testing means including circuit means comprising two parallel test conductors, two resistors connected in series with one of said test conductors forming a voltage divider, one of said resistors being individual to each connecting device and the other resistor being common to said test multiple, and a test relay individual to each connecting device, said test relay being disposed in said second test conductor for testing said test multiple for an idle outlet prior to extending a connection over the corresponding connecting device to said centrally disposed switching device, said test relay operating upon finding an idle tested outlet in said test multiple.

2. A system and cooperation of elements as defined in claim 1, comprising switching means for said switching devices, and circuit means controlled by said switching means responsive to failure of said test to operate for causing said testing means to reestablish the testing condition of the corresponding test relay in a sequence which increases the probability of seizure of an idle outlet in said test multiple in the presence of substantially simultaneously initiated testing of a plurality of connecting devices.

3. A system and cooperation of elements as defined in claim 2, wherein said switching means is a relay interrupter comprising two relays, said relays effecting a relatively brief closure and a relatively long opening interval for the test circuit to said test multiple.

4. A system and cooperation of elements as defined in claim 3, wherein the opening interval of said test circuit is determined by the energization and deenergization intervals of the relays of said relay interrupter, and wherein the closure interval of said test circuit is determined by the deenergization interval of one of said relays of said relay interrupter.

5. A system and cooperation of elements as defined in claim 4, wherein the relay of said relay interrupter which determines the opening interval of said test circuit is slow-to-operate.

6. A system and cooperation of elements as defined in claim 4, wherein the sequence of reestablishing the testing condition of said test relay is determined by the characteristics of the response intervals of the relays of said relay interrupter.

7. A system and cooperation of elements as defined in claim 4, comprising a capacitor connected in parallel with one of said relays of said relay interrupter for making said relay slow-to-operate to control the instances of reestablishing the testing condition of said test relay.

8. A system and cooperation of elements as defined in claim 5, comprising a capacitor, and means for connecting said capacitor in parallel with one of said relays of said relay interrupter which is slow-to-operate for the purpose of controlling the instances of reestablishing the testing conditions of said test relay.

9. A system and cooperation of elements as defined in claim 1, wherein said connecting devices are zone-determining devices, said zone-determining devices being common to a plurality of toll lines, said centrally disposed switching device being a zone-evaluating device common to said zone-determining devices, and said test multiple being common to said zone-determining devices.

10. A system and cooperation of parts as defined in claim 1, comprising switching means for said switching devices, and circuit means controlled by said switching means responsive to failure of said test relay to operate for causing said testing means to reestablish the testing condition of said test relay in a sequence which reduces the probability of substantially simultaneous testing of said common test multiple by a plurality of connecting devices.

11. A system and cooperation of parts as defined in claim 1, comprising switching means for said switching devices, and circuit means controlled by said switching means responsive to failure of said test relay to operate for causing said testing means to reestablish the testing condition of said test relay in a sequence which reduces the probability of coincident testing of said common test multiple by a plurality of connecting devices.

No references cited.